JOHN C. SCHOOLEY.
Improvement in Portable Fare Boxes.

No. 125,088. Patented March 26, 1872.

Witnesses:
G. Mathews
John A. Lemon

Inventor:
John C. Schooley
Per Munn & Co.
Attorneys.

UNITED STATES PATENT OFFICE.

JOHN C. SCHOOLEY, OF NEW YORK, N. Y.

IMPROVEMENT IN PORTABLE FARE-BOXES.

Specification forming part of Letters Patent No. 125,088, dated March 26, 1872.

Specification describing a new and useful Improvement in Fare-Boxes, invented by JOHN C. SCHOOLEY, of New York, in the county of New York and State of New York.

The object of my invention is to provide for use on street-railway lines, or wherever else it can be made practicable, an improved form of portable box for the collection of fares. Although many portable fare-boxes have been presented to the public, yet up to this time not one has been successfully introduced, solely on account of the want of practicability in respect to compactness and sure prevention against theft of its contents.

My fare-box is made very compact, free of complicated parts, and so constructed as to secure the greatest economy of care and labor on the part of the conductor in its use. In order to combine these qualities in my box, I provide a semi-partition reaching from the floor of the inside of the box to a point preferably about equidistant between the top and center of the box, but in any case leaving sufficient space for fares to pass over the top of said semi-partition; or, in other words, by means of the said partition in connection with a familiar and necessary movement of the box by the person holding the same, and almost unknown to him the contents will be compelled to pass from one part of the box to another part of the same box, there to remain until removed through a door provided for that purpose. In connection with this partition and its valve I employ a long entrance channel or tongue, so suspended from or attached to the top of the box as to leave a space all around it, whereby the extraction of fares by means of wires, &c., previous to inversion of the box, is effectually prevented.

In order that others may understand the operation of my improved fare-box, I will proceed to describe its operation by reference to the annexed drawing and letters of reference thereon.

Figure 1:
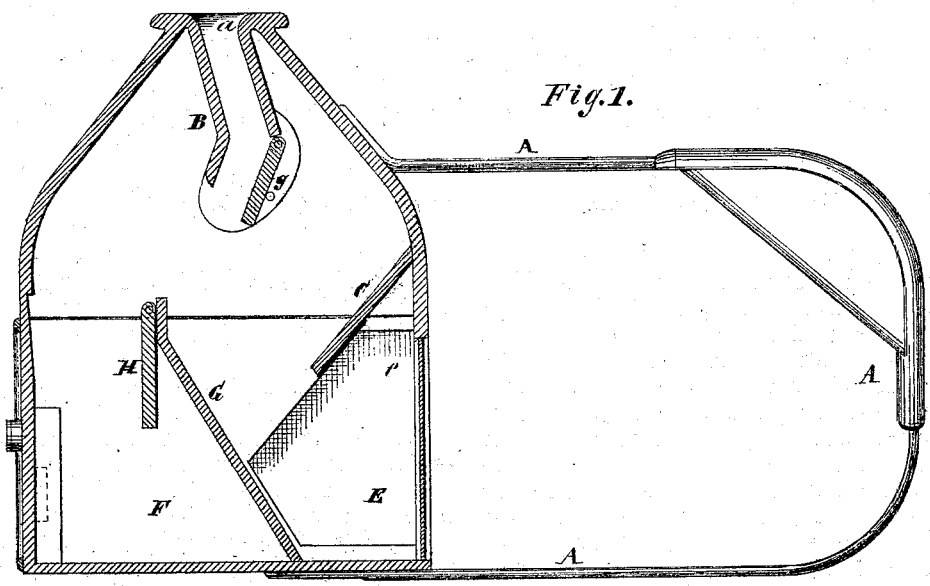
Figure 2:
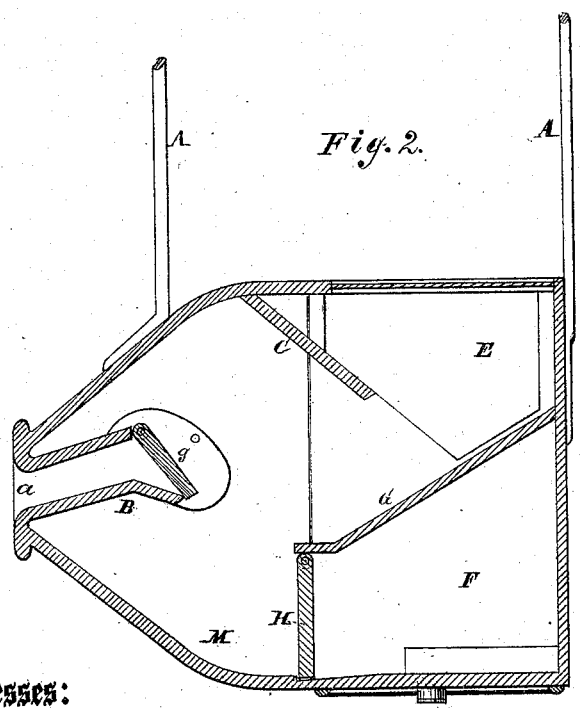

Figures 1 and 2 represent sectional elevations of my fare-box, in the vertical and the suspended or inverted positions, respectively.

I provide a box, of any suitable size, form, or material, with a handle, A, which is attached to it in such a manner that when extended horizontally the box will be vertical and the fare may be deposited in the opening $a$ in the top of the box. This opening $a$ is the mouth of a long box-like channel or passage-way, B, through which fares pass to the interior of the box. This is suspended, as it were, from the top or roof of the box, so as to leave a clear space all around it, and thus frustrate any attempt to extract fares by working them along the sides or ends of the box. To prevent fares accidentally falling into the entrance-channel B while the box is being inverted, I provide it with a valve, $g$, as shown. A fixed inclined shelf, C, is arranged partly to hide the inside of the chamber E from inspection through the entrance-channel B, and partly to prevent fares leaving the chamber E except by sliding over the partition G. The semi-partition G is made permanent to the floor of the box, and reaches to within a short distance of the top, allowing room between itself and the top of the box for the fares to pass without difficulty. A valve, H, is hinged to the top of this semi-partition G, and made to close when the box is inverted, so as to prevent the fares that have been deposited behind the partition from being removed. Glass plates $e$ are employed to render the interior of the box, at E, visible.

The operation of the box is as follows—viz: When the fare is to be received the box is extended by means of the handles, as in Fig. 1, and the fare passed through the opening $a$ falls through the passage B into that part of the box represented by E; then, by simply dropping the box by the handle, as in Fig. 2, the contents at E will pass over the partition G and rest at M, and when the box is presented for another fare the contents at M will take their place at F, and there remain incapable of dislodgment except through the door. Thus the mere act of allowing the box to be suspended in an easy and natural position by the handle insures the safe deposit of the fare in the lock-chamber F. It will be seen that the partition G extends across the box, and is in such relation to the lower end of the inclined channel B that it is impossible to extract fares by use of waxed wires, &c., previous to their deposition in chamber F, or while resting in chamber E. To insure this it is necessary that the channel be made long, so that the fares shall lie around it in place of passing into it when the box is but partly inverted. The channel B is therefore essential to the perfect operation of the box as a safe deposit for fares.

Having thus described my invention, what I claim as new, and desire to secure by Letters Patent, is—

In a portable fare-box, the arrangement of the stationary partition G, valve H, and suspended entrance-channel B, as described, for the purpose of guiding the fare when deposited successively into chambers E, M, and F, and preventing its return by the simple act of lowering and raising the box, substantially as described.

JOHN C. SCHOOLEY.

Witnesses:
J. B. HALL,
E. B. WOOD.